United States Patent [19]

Wallace

[11] 4,417,629
[45] Nov. 29, 1983

[54] DRILL BIT AND METHOD OF MANUFACTURE

[75] Inventor: Duane W. Wallace, Houston, Tex.

[73] Assignee: Reed Rock Bit Company, Houston, Tex.

[21] Appl. No.: 263,333

[22] Filed: May 13, 1981

[51] Int. Cl.³ .............................. B21K 5/02; E21B 9/08
[52] U.S. Cl. ................................. 175/365; 76/108 R; 76/108 A; 76/101 E; 175/356
[58] Field of Search ............. 76/108 R, 108 A, 101 R, 76/101 E, 101 A; 175/339, 340, 342, 356, 366, 375, 365, 367–370

[56] References Cited

U.S. PATENT DOCUMENTS

| 4,158,973 | 6/1979 | Schumacher, Jr. et al. ...... 76/108 A |
| 4,256,194 | 3/1981 | Varel .......................... 76/108 R X |
| 4,333,364 | 6/1982 | Varel ............................... 76/108 A |

Primary Examiner—Frederick R. Schmidt
Assistant Examiner—Debra S. Meislin
Attorney, Agent, or Firm—Michael J. Caddell

[57] ABSTRACT

A method of making a rolling cutter drill bit involving the steps of forming a body member having an upper portion adapted to be threaded and passaging therein, forming at least one arcuate recess in the lower end of the body member, providing a lug assembly comprising a lug member having a bearing journal carrying a rolling cutter and an arcuate surface adapted to be received in the recess, and securing the lug assembly in the recess with the arcuate surface of the lug member in engagement with the arcuate recess. A drill bit made according to the foregoing method is also disclosed.

8 Claims, 3 Drawing Figures

DRILL BIT AND METHOD OF MANUFACTURE

BACKGROUND OF THE INVENTION

The present invention is directed to the method of manufacturing drilling bits and more particularly involves those types of bits disclosed in a companion application Ser. No. 156,883, filed June 5, 1980 by John D. Parrish entitled "Large Diameter Oil Well Drilling Bit", now U.S. Pat. No. 4,369,849, issued Jan. 25, 1983. A second, co-pending application, Ser. No. 156,715, filed June 5, 1980 by John D. Parrish entitled "Method of Manufacturing Large Diameter Oil Well Drilling Bit" also relates to the present application. These two companion applications are hereby incorporated herein by reference. This disclosure illustrates an improvement bit and method of manufacturing said bit over those disclosed in the above-incorporated applications.

Large diameter bits, generally termed "tophole" bits generally comprise either four cutter bits or else they are tricone bits such as that disclosed herein. The general method of manufacturing large diameter tri-cone bits is in utilizing the segmented arc construction method. In this method, three 120 degree lug sections are welded together to form a generally cylindrical bit body having downwardly extending leg assemblies. The three sections are usually forged and machined to form the 120 degree lugs and then the cutter assemblies are formed and placed on the lugs prior to welding the three lugs to form the single bit. Because of the size of the tophole bits, minor variations and tolerances in angles of assembly and the alignments of the three lug sections result in substantial final errors in the bit specifications and dimensions. Because of the roughness and inaccurateness of the three arcuate lug sections machining of the mating surfaces is difficult to control within tolerance. When the three lug sections are welded together to form the final bit structure, the cutters are generally not aligned axially or radially within the desired bit specifications.

The aforementioned incorporated companion applications disclose bits and their methods of manufacture which are significant improvements over the triple segment bit construction method of the conventional bits. In the aforementioned companion applications, a unitary bit body is formed of cast metal and three separate shoulders or recesses are machined individually into the bit body to receive pre-assembled lug assemblies. Each of the recesses comprises a generally right angular shoulder or shelf area to receive the mating right angular end of each particular lug assembly. Generally, these right angular shoulders are formed individually by horizontal milling techniques. After the first two lug assemblies have been welded in place on the unitary body, the third lug assembly is placed in proper alignment and shimmed and welded in place. The third lug assembly is difficult to weld in place because of the restricted access to the weld area due to the placement of the first two lug assemblies. Because of the close intermesh of the three conical cutters, welding must be performed through the side of the bit through the openings between the three downwardly extending lugs. Generally, the welding of the first two lug assemblies is not as difficult as that of the third assembly because of the easier access to the first two lug assemblies through the area where the third assembly must later be placed.

The present invention eliminates the need for three separate horizontal milling operations to prepare the unitary bit body and also eliminates the highly restricted welding access feature of the aforementioned incorporated disclosures. The present invention also overcomes the inaccurate assembly methods required in the three arcuate segment construction of conventional tri-cone bits. These advantages are overcome by providing a single unitary bit body which may be machined to receive the three lug assemblies in a single pass rotary milling operation which also provides greatly increased access to welding the three lug assemblies to the body.

DESCRIPTION OF THE PREFERRED EMBODIMENTS

Figure 1:
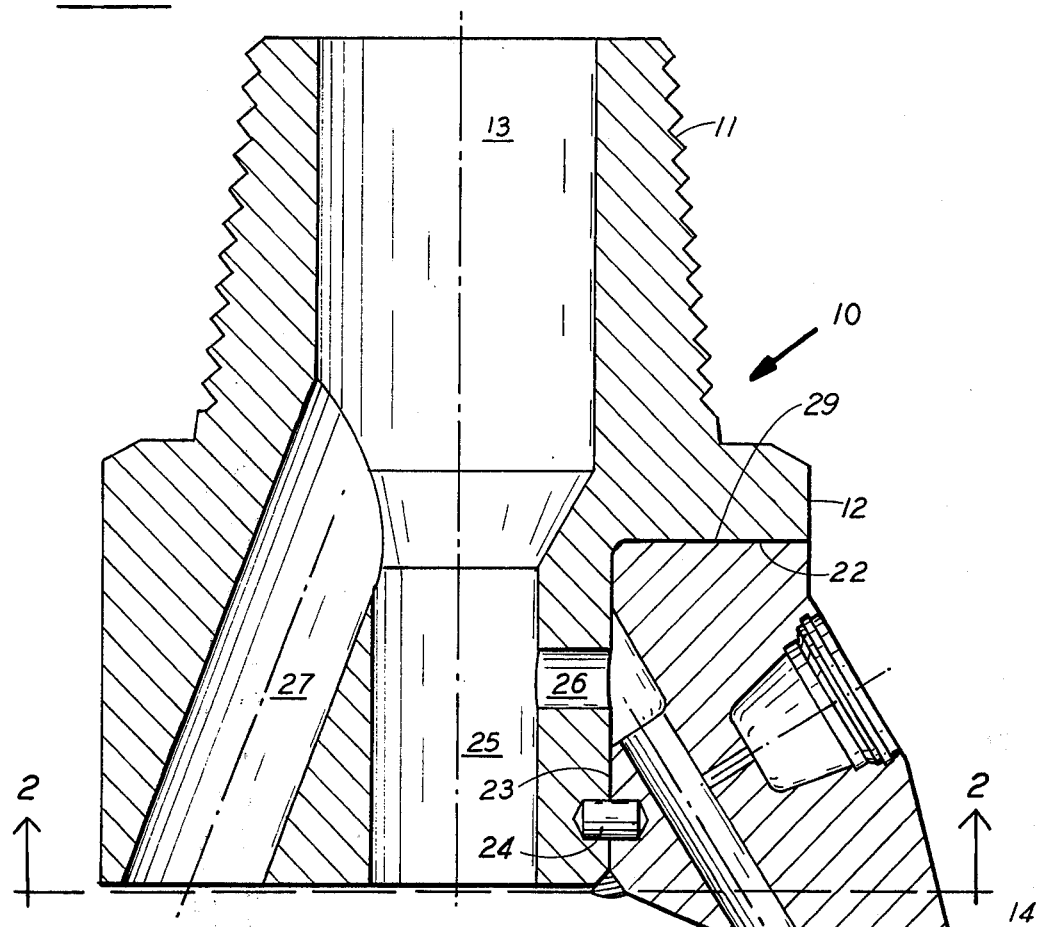
FIG. 1 is a cross-sectional side view showing a bit body having a single lug assembly attached thereto.

Referring now to FIG. 1, a tri-cone rolling cutter drill bit 10 is disclosed having an upper threaded pin end 11, the main body section 12 with a central bore passage 13 and a lug assembly 14 secured to body member 12. Lug assembly 14 consists primarily of a downwardly extending leg 15 having a generally cylindrical bearing journal 16 formed thereon. A frusto-conical rolling cutter 17 having protruding cutting elements (not shown) is rotatably mounted by bearing means 18 on journal 16. Bearing means 18 comprises ball bearings which seat in a complimentary ball bearing race 19 formed in journal 16. A bore passage 20 extends through journal 16 and communicates with ball bearing race 19. An air supply passage 21 passes through lug assembly 14 and communicates with bore 13 by means of a sub-bore 25 and a connecting passage 26. A plurality of fluid jet supply passages 27 are formed in body member 12 and exit at the lower end thereof.

Figure 2:
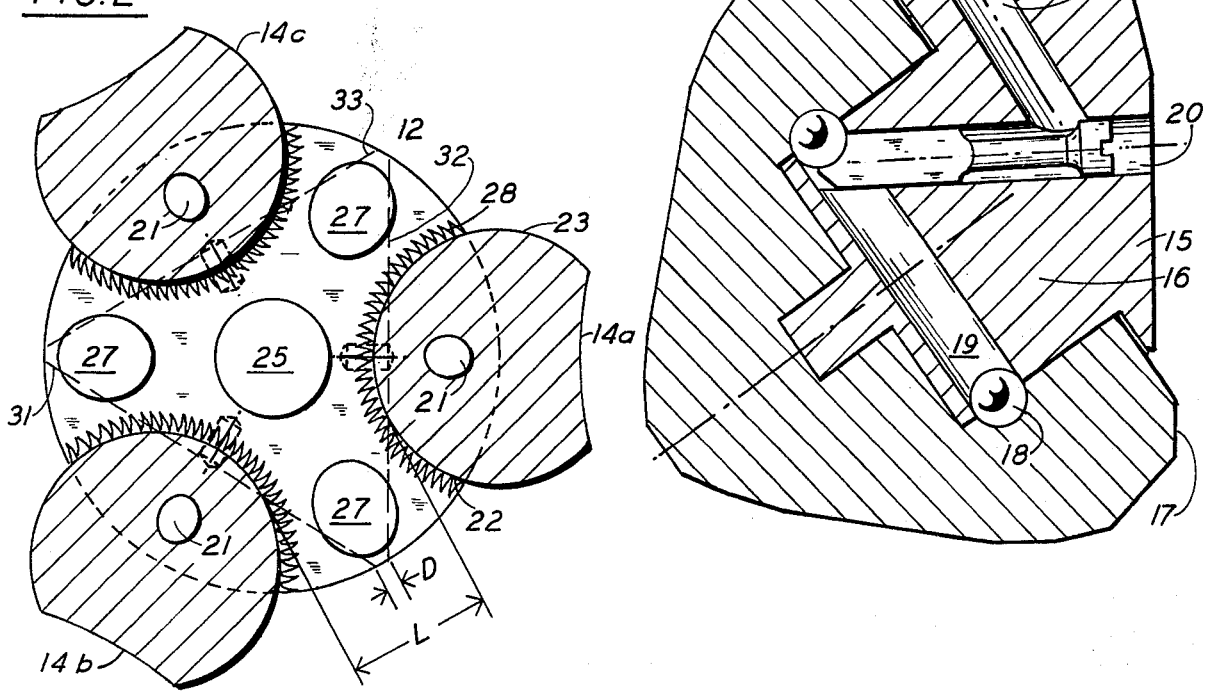
FIG. 2 is a cross-sectional axial view of FIG. 1 taken at line 2—2 therein.

A recess 22 having an arcuate abutment wall 23 is formed in the side of body member 12 adjacent the lower end thereof adapted to receive a lug assembly 14. The recess 22 is defined by an arcuate side abutment wall 23 configured as a portion of a surface of revolution (e.g., a cylinder as shown in FIGS. 1 and 2) with its axis generally parallel to the central axis of the body member and an upper end surface 29 extending generally perpendicular to the central axis of the body member. The lug assembly 14 comprises a lug member having side and upper end surfaces corresponding in size and configuration to surfaces 23, 29, respectively, for enabling the lug member to be fitted in the recess in surface-to-surface engagement therewith. Alignment of lug assembly 14 in recess 22 in the proper and desirable orientation may be accomplished by the use of interfitting dowel pins 24 which project into wall 23 and lug 14. A weld groove is provided along the lower end of wall 23 and the adjacent portion of lug 14 to provide a channel for weldment 28 which fixedly secures lug assembly 14 in recess 22. Additional weld may be added along the exposed interface between conjoining surfaces of lug 14 and body member 12.

FIG. 2 is an axial end view of the tri-cone rolling cutter drill bit of FIG. 1 taken at line 2—2 thereof. In FIG. 2, the tri-cone nature of the drilling bit is disclosed having three lug sections 14 welded to the cylindrical unitary integral body member 12. In FIG. 2, the arcuate nature of the abutment surface 23 is clearly illustrated. Also, the weld line 28 is shown attaching each lug assembly 14 to the body member. The exit ports of bore passages 25 and 27 are also located equispaced between the three downwardly projecting lugs. Each lug assembly 14 of the tri-cone bit is generally typified by the schematic illustration of the same assembly shown in FIG. 1.

Figure 3:
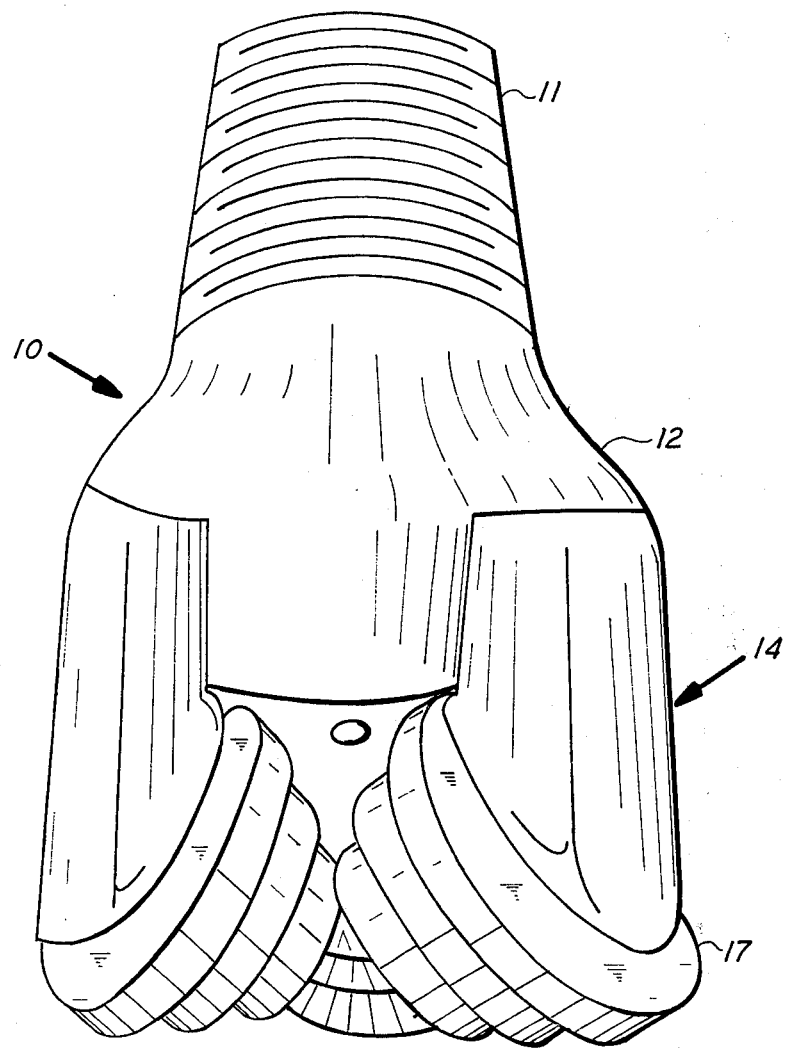
FIG. 3 is a schematic view of a tri-cone rolling cutter drill bit manufactured according to the present invention.

The shematic illustration of FIG. 3 shows a diagramatic symbolic illustration of a completed drill bit made according to the present invention wherein the body member 12 having three lug assemblies 14 and three rolling cutters 17 mounted thereon with an upper threaded pin end 11.

In constructing the rolling cutter drill bit 10 a generally cylindrical body member 12 is formed utilizing conventional methods such as forging, casting, or machining from billet stock. The material of body member 12 may be selected of a low-cost alloy such as mild steel since there are no bearing surfaces or high stress surfaces such as those located in the lug assembly. A great savings in cost can be achieved by selection of low grade alloys in the body portion. After the body portion is generally formed, the bore passages 13, 25, 27 and 26 may be formed either integrally with formation of the original body portion or may be machined by drilling or other machine techniques. Likewise, the threaded pin end 11 is machined by conventional techniques. After formation of the body portion 12, arcuate recesses 22 are formed therein by means such as circular milling, casting or forging. Generally, a circular milling operation is more economical and provides more accurate abutment surfaces than other methods. Likewise, the circular milling technique utilized to form the preferred embodiment of this invention is easier to set up and accomplish than the horizontal milling techniques utilized in previous bit fabrication methods.

After the arcuate recesses 22 have been formed equiangularly in body member 12 at approximately 120 degree orientations thereon, the lug assemblies 14, having the rolling cutter 17 already mounted thereon, are secured to body member 12. Prior to securing lug members 14, alignment dowels 24 may be placed in previously formed dowel recesses to provide proper and desired alignment of the lugs in the recess openings. The dowel locations may be modified according to the bit designer's desires to provide any desired amount of angular skew of the lug assemblies as measured between the axis of each journal and a radial line emanating from the central axis of the body member and extending through the journal. Because of the arcuate nature of the abutment surfaces between the body and the lug, the angular rotation to provide desirable skew does not alter the interface between the abutting surfaces nor significantly change the amount of such interface surface nor the amount of weld area available.

After the lugs 14 have been properly located in space 22 of body 12 by means of dowels 24, an electric arc weld may be performed along 28 to fixedly secure lugs 14 in the body. Similarly, weld is performed along the remaining seams of the interface around the recess 22 to completely secure the lug therein. After all three lug assemblies 14 have been welded into the three recesses 22 in the body, the bit is complete and ready for operation.

The present invention provides several advantages over previously known and conventional methods of bit manufacture. For example, as previously mentioned, a circular milling process to form the abutment recesses 22 is much easier to perform economically and accurately than the horizontal milling technique used in previous bits. Likewise, a given amount of angular skew of the lug assemblies can be provided by merely rotating the lug assemblies in the arcuate cylindrical recess which does not alter or change the amount of weld area and the locations of the weld interface. Also, the body member 12 may be formed of a low cost mild steel alloy and the lugs can be formed of a higher alloy, more expensive material to provide additional heat treating and strength characteristics. Also, it is clear that the body member can be utilized to form various sizes of bits by interchangeability of lug members 14. In addition, the present bit techniques provides a bit which allows replacement of lug assemblies 14 in the field should they become prematurely frozen or damaged during early operation. Also, when the bit has run a full run and the cutters have worn out, the body members can be re-used by cutting off the old lug assemblies and welding new assemblies on the bodies. Because of the shortened nature of the lugs over the conventional 120 degree arcuate lug arrangement, smaller machines to form the bearing surfaces on the lugs can be utilized.

In addition to the above-mentioned advantages, one exceptional advantage provided by the arcuate recess technique disclosed herein is that the provision of arcuate abutment surfaces, and more particularly, the provision of cylindrical arcuate abutment surfaces provides a larger surface area and weld interface while providing a greater access for the welding equipment. For example, it can be seen in FIG. 2 that after the first two lugs have been welded and because of the inwardly projecting nature of the cutters 17, welding of the third and final weld member could be rather difficult because of the restricted access to the full diameter of the weld line 28. In conventional bits, which have been manufactured by the composite method, the straight-across nature of the lugs welded to the body provides extremely small open spaces between the lugs, thus welding of the final lug assembly to the body is very difficult because of the restricted access of the welding rod between the adjacent lug members. Due to the tight intermesh of the teeth on the cutters, welding of the third member must be achieved from the side rather than from the bottom of the bit. When the lug members extend straight across, there is a very small gap between adjacent lug members offering little room to manuever the welding equipment. The present invention provides more than double the normal gap through the use of the cylindrical arcuate recesses. Also, the cylindrical recesses provide increased space for nozzle and jet openings indicated at 27 in FIG. 2. Thus, larger nozzles and those nozzles having extended length may be utilized without interference with the adjacent lug members.

Referring to FIG. 2, the advantage of increased nozzle space is illustrated by the phantom lines 31 and 32 indicating placement of the flat abutment surfaces of conventional bits as opposed to the cylindrical surfaces of the present invention. It can be seen from the location of the conventional abutment surfaces 31 and 32 that the size and location of fluid jet openings 27 must be redesigned in conventional bits and result in much smaller openings placed closer in toward the center of the bit. Furthermore, it can be seen from examining FIG. 2 and the locations of the conventional flat abutment surfaces, that a very narrow access space indicated at "D" is provided for the welding of the third lug member to the bit body. Assuming that lug members 14a and 14b are secured to the body before 14c, it can be seen that the only access to the third lug member 14c, using conventional flat abutment surfaces, is through the narrow restricted opening indicated at "D". The opening provided by the present invention for welding of the third lug member is located in the drawing by the dimension "L". The dimension "L" also indicates the large amount of area opened up for placement of jet openings 27 and indicates that openings 27 may be spaced radially outward from 25 any desired distance, limited only by the outer circumference of body member 12.

Although certain preferred embodiments of the present invention have been herein described in order to provide an understanding of the general principles of the invention, it will be appreciated that various changes and innovations can be affected in the described composite drill bit manufacturing method without departing from these principles. For example, whereas a tri-cone rolling cutter drill bit has been disclosed as a preferred embodiment, it is obvious that one would utilize the concepts of this invention to form a drill bit having either more or less cutters and lugs than the three shown herein. For example, a four cutter drill bit or a one or two cutter drill bit could be manufactured using the methods of this invention. Thus, all modifications and changes of this type are deemed to be embraced by the spirit and scope of this invention except as the same may be necessarily limited by the appended claims or reasonable equivalents thereof.

The embodiments of the invention in which an exclusive property or privilege is claimed are defined as follows:

1. A method of fabricating a rolling cutter drill bit, said method comprising the steps of:
   forming a body member having an upper portion adapted to be threaded;
   forming at least one recess in the side of said body member adjacent the lower end thereof, the recess being defined by an arcuate side wall configured as a portion of a surface of revolution with its axis generally parallel to the central axis of the body member, and by an upper end surface extending generally perpendicular to the central axis of the body member;
   providing at least one lug assembly comprising a lug member having side and upper end surfaces corresponding in size and configuration to said side and upper end surfaces defining said recess, respectively, for enabling the lug member to be fitted in the recess in surface-to-surface engagement, and a bearing journal at the lower end of the lug member, and a rolling cutter rotatably mounted on the bearing journal; and
   securing said lug member in said recess at a predetermined angular position therein, whereby the skew angle between the axis of the journal and a radial line emanating from the central axis of the body member and extending through the journal may be set at a predetermined angle.

2. The method of claim 1 further comprising the step of providing dowel recesses in the side wall defining said recess and in the lug member, and an alignment dowel positioned in said dowel recesses for aligning said lug assembly on said body member.

3. The method of claim 1 wherein said second forming step comprises forming three of said recesses in the body member at spaced intervals therearound.

4. The method of claim 1 wherein said surface of revolution is a cylinder.

5. A rolling cutter drill bit comprising:
   a body member having a threaded upper portion and at least one recess in its side adjacent the lower end thereof, the recess being defined by an arcuate side wall configured as a portion of a surface of revolution with its axis generally parallel to the central longitudinal axis of the body member, and by an upper end surface extending generally perpendicular to the central longitudinal axis of the body member; and
   at least one lug assembly comprising a lug member having side and upper end surfaces corresponding in size and configuration to said side and upper end surfaces defining said recess, with the lug member fitted in the recess in surface-to-surface engagement, the lug member further having a bearing journal at the lower end thereof, the lug assembly further comprising a roller cutter rotatably mounted on the bearing journal; whereby, during assembly of the bit, when the lug member is to be secured in the recess, the angular position of the lug member in the recess and thus the skew angle between the axis of the journal and a radial line emanating from the central axis of the body member and extending through the journal may be set at a predetermined position and a predetermined angle, respectively.

6. A rolling cutter drill bit as set forth in claim 5 further comprising dowel recesses in the side wall defining said recess and in the lug member, and an alignment dowel positioned in said dowel recesses for aligning said lug assembly on said body member.

7. A rolling cutter drill bit as set forth in claim 5 wherein the body member has three of said recesses at spaced intervals therearound.

8. A rolling cutter drill bit as set forth in claim 5 wherein said surface of revolution is a cylinder.

* * * * *